(12) United States Patent  
Bester

(10) Patent No.: US 8,671,067 B2
(45) Date of Patent: Mar. 11, 2014

(54) METHOD AND SYSTEM FOR EVENT PATTERN DETECTION

(75) Inventor: Colin Bester, Dripping Springs, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 240 days.

(21) Appl. No.: 12/911,317

(22) Filed: Oct. 25, 2010

(65) Prior Publication Data

US 2011/0270791 A1 Nov. 3, 2011

Related U.S. Application Data

(60) Provisional application No. 61/254,341, filed on Oct. 23, 2009.

(51) Int. Cl.
*G06F 17/00* (2006.01)
*G06N 5/02* (2006.01)
*G01M 1/38* (2006.01)
*G05B 13/00* (2006.01)
*G05B 15/00* (2006.01)
*G05D 23/00* (2006.01)

(52) U.S. Cl.
USPC ............................................. 706/47; 700/276

(58) Field of Classification Search
USPC ............................................. 706/47; 700/276
See application file for complete search history.

(56) References Cited

U.S. PATENT DOCUMENTS

| 5,924,486 | A | 7/1999 | Ehlers et al. |
| 6,976,366 | B2 * | 12/2005 | Starling et al. ................. 62/126 |
| 7,130,719 | B2 * | 10/2006 | Ehlers et al. .................. 700/276 |
| 7,333,880 | B2 * | 2/2008 | Brewster et al. ............... 700/286 |
| 7,343,226 | B2 * | 3/2008 | Ehlers et al. .................. 700/276 |
| 7,343,751 | B2 | 3/2008 | Kates |
| 7,349,761 | B1 * | 3/2008 | Cruse ............................ 700/276 |
| 2002/0118118 | A1 * | 8/2002 | Myllymaki et al. ......... 340/686.1 |
| 2003/0055677 | A1 * | 3/2003 | Brown et al. ....................... 705/1 |
| 2005/0222810 | A1 * | 10/2005 | Buford et al. .................. 702/183 |
| 2007/0043477 | A1 | 2/2007 | Ehlers et al. |
| 2007/0043478 | A1 * | 2/2007 | Ehlers et al. .................. 700/276 |
| 2007/0233323 | A1 * | 10/2007 | Wiemeyer et al. ............. 700/276 |
| 2008/0167756 | A1 * | 7/2008 | Golden et al. ................. 700/297 |

OTHER PUBLICATIONS

Shyh-Kwei Chen, et al.; "Complex Event Processing using Simple Rule-based Event Correlation Engines for Business Performance Management"; 8th IEEE International Conference on E-Commerce Technology and the 3rd IEEE International Conference on Enterprise Computing, E-Commerce, and E-Services; 2006.*

(Continued)

*Primary Examiner* — Jeffrey A Gaffin
*Assistant Examiner* — James F Sugent

(57) ABSTRACT

Data relating to energy management may be collected and stored from one or more sites. This data may be analyzed by a series of rules, and each rule may look for certain patterns in the data over time. Each time a pattern is detected in the data, the rule may create and store an event back into the database. Each event may represent the detection of a specific condition that starts at a specific time and continues for a specific duration. Each rule may also dynamically assign and update a score to each event that indicates its level of importance and persistence. Once the raw data has been analyzed and events have been created that represent basic conditions, a new set of rules may analyze the events themselves, in addition to, or rather than, the raw data. Successive passes of rules can thus detect higher level, broader problems.

18 Claims, 2 Drawing Sheets

(56) References Cited

OTHER PUBLICATIONS

Shyh-Kwei Chen et al, "Comples Event Processing Using Simple Rule-Based Event Correlation Engines for Business Performance Management", Proceedings of the 8th IEEE International Conference on E-Commerce Technology and the 3rd IEEE International Conference on Enterprise Computing, E-Commerce, and E-Services (CEC/EEE 2006) (8 pages).

Mexican Office Action dated Jun. 10, 2013, for application No. MX/2013/034099 (3 pages).

* cited by examiner

METHOD AND SYSTEM FOR EVENT PATTERN DETECTION

CROSS-REFERENCE TO RELATED APPLICATIONS

This non-provisional application claims priority based upon prior U.S. Provisional Patent Application Ser. No. 61/254,341 filed Oct. 23, 2009 in the name of Colin Bester, entitled "Method and System for Event Pattern Detection," the disclosure of which is incorporated herein by reference.

BACKGROUND OF THE INVENTION

The present invention related generally to energy management platforms and, more particularly, to event pattern detections with energy management platforms.

Client facilities may benefit from the successful installation of an energy management platform. An energy management platform may include the capability to monitor data and control equipment. If a client facility is extremely dynamic and environmental conditions at the client facility are continuously changing, then there is a greater likelihood that an energy management platform will be incorrectly configured and its equipment will fail, deteriorate or be physically damaged. At the same time, if an energy management platform is managed, either in isolation or together with other energy management platforms at other client facilities, then there is a greater likelihood that the energy management platform will work effectively. Management of an energy management platform may include detection of failures of the energy management platform and detection of changes at or to the client facility and/or the energy management platform. Management of an energy management platform may also include correcting such failures or changes. In order to maximize maintenance and management resources and reduce expenses, it can be appreciated that there is a significant need for energy management platforms that may detect problems at multiple client facilities in a manner that allows for automatic ranking of the repair priorities across the multiple client facilities. Embodiments of the present invention can provide these and other advantages, as will be apparent from the following detailed description and accompanying figures.

SUMMARY OF THE INVENTION

Performance and operational data may be collected and stored at one or more sites. Periodically, the site may be polled and the collected data may be transmitted to a central server. At the server, this data may be analyzed by a series of rules, implemented as computer programs. Each rule may look for certain patterns in the data over time. For example, temperature data trends from an HVAC system can be diagnosed to reveal compressor failure, fan failure, mis-configuration and so on. Each time a pattern is detected in the data, the rule may create and store an event back into the database enriching the dataset. Each event may represent the detection of a specific condition that starts at a specific time and continues for a specific duration. Each rule may also dynamically assign and update a score to each event that indicates its level of importance and persistence.

Once the raw data has been analyzed and events have been created that represent basic conditions, a new set of rules may analyze the events themselves, in addition to or rather than the raw data. For example, a run of communications failures for different devices that all use the same communication bus can be diagnosed as a higher-order event: instead of the failure of a single device, a higher order event can represent the failure of the entire communications bus. Successive passes of rules can thus detect higher level, broader problems. Successively higher levels of events can have higher scores. The result may be a prioritized list of problems occurring at each site that can be used to rank all sites in the order in which problems need to be addressed. Computerized visualization systems may also display events over time. Temporal patterns may be detected in the events that allow for the diagnosis of very difficult patterns.

DETAILED DESCRIPTION

Figure 1:
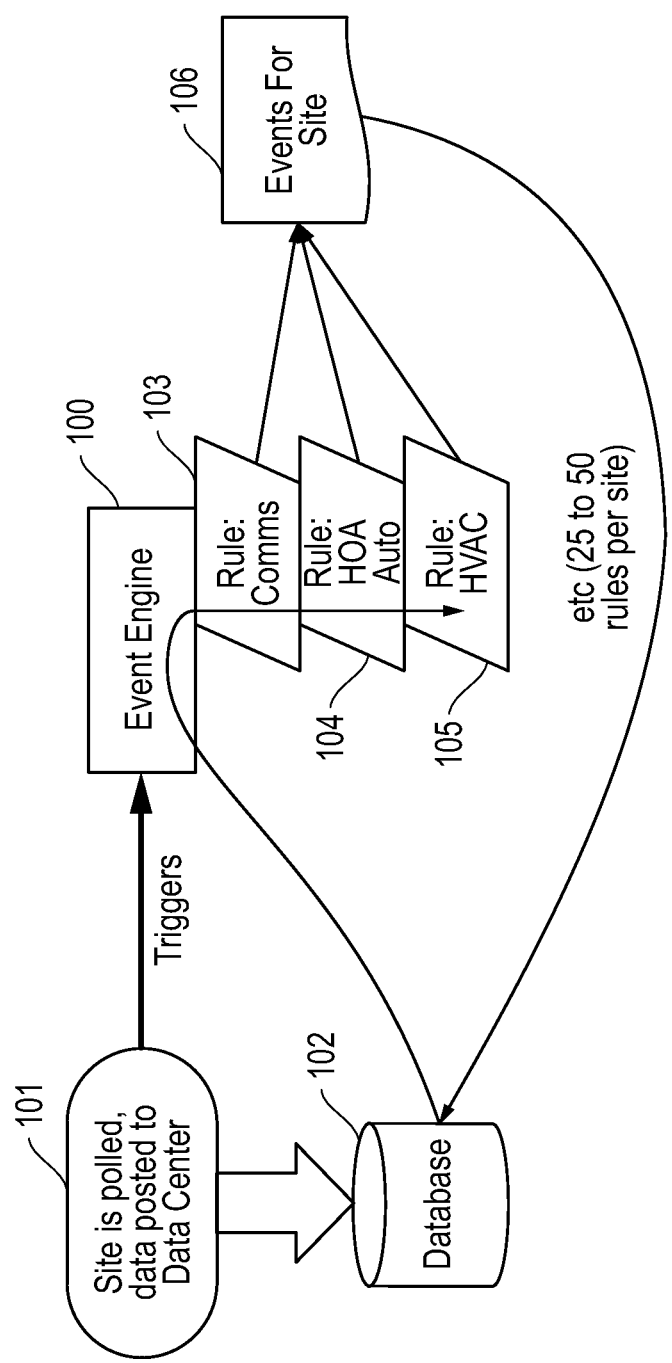
FIG. 1 shows an illustrative flow diagram of one embodiment of an event engine of the present invention.

Referring now to FIG. 1 which depicts an event engine 100. Data 101 may be polled from one or more sites, such as a client facility, and may be posted to a database center 102. The database center 102 could be any database known in the art such as, for example, a database hosted at an off-site data center, an on-site database or an embedded database. The data 101 may be collected continuously, intermittently, or manually. For example, information regarding events could be collected every 2 hours, every morning and every evening, every five minutes, or some combination of the foregoing. In certain circumstances, it may be important to obtain event information more frequently such as, for example, if the event relates to a refrigeration unit or a heater.

The event engine 100 may take the polled data 101 to determine what events 106 have occurred. To do this, the event engine 100 may apply the data 101 against one or more rules. The rules may be programs that analyze a series of data points from a site to determine if something interesting is occurring or has occurred. For example, a rule may be established to create an event if the refrigeration temperature is over 41 degrees for more than 35 minutes, if a light never gets over 100 foot-candles in a 48 hour period, if a light never goes below 100 foot-candles in a 24 hour period, if the humidity is over 65% for more than 1 hour, etc. An event may occur whenever a rule is triggered. Each event may have a unique ID, start time, finish time, event key, sensor key, category, score and/or message.

The event engine 100 may use a combination of current events 106 and new data 101 to create new events or update the current event 106. The event engine 100 may, for example, use new data 101 to increase the score of the current event 106 or close the current event 106.

Three example rules are depicted in FIG. 1: communications 103, HOA auto 104, and HVAC 105. In one embodiment, twenty five to fifty rules may be established for a site. In one embodiment, a rule may be used to create an event if event information simply exceeds a preset value. In other embodiments, however, a rule may be used to create an event based on information about whether and how such event information exceeds a preset value. For example, in one embodiment information may be presented about an event such as, for example, whether the set point was exceeded for a period of time or is repeatedly exceeded during a particular time of the year. This information may be stored in the database. It is important to note that events are not always associated with problems, they can simply be an indication that an activity of interest is occurring or not occurring.

In one embodiment, the event engine 100 may be viewed as a black box which generates events and a matrix field, which gives a description of the characteristic of the events. This description may be included, for example, in an exception dashboard so that the customer sees a message portion from the event for the site. A message portion could be a note regarding an issue such as "HVAC zone 1 out of spec" or "HVAC2 run time exceeded" or the like. In one embodiment, the message portion does not have to reveal any information regarding the event itself. Instead it may be a very simple message or suggestion for the client rather than a detailed explanation of issues.

In one embodiment, it is possible to detect and analyze performance patterns, especially if the data includes information about or from various different measured devices. For example, if a site has ten refrigeration units and data points are collected from each of those units each hour and the data is processed through the event engine 100, meaningful patterns may be detected in the data and/or in the events. In another example, if the temperature of each of the refrigeration units is above 41 degrees for more than 35 minutes at a certain period of time during the day, it may indicate a peak load time or it may indicate some other problem affecting the operating efficiency of the units. Since each data point and each event is stored in the database, a comparison of data and events over time is possible.

In one embodiment, an event's evolution over time may be detected or analyzed. For example, an event may grow in priority over time as the conditions at the client facility worsen. One facility may want to receive a warning when its refrigeration unit reaches a temperature greater than 41 degrees for a period greater than 30 minutes and another facility may want a warning when the temperature is greater than 43 degrees for a period greater than 20 minutes.

Figure 2:
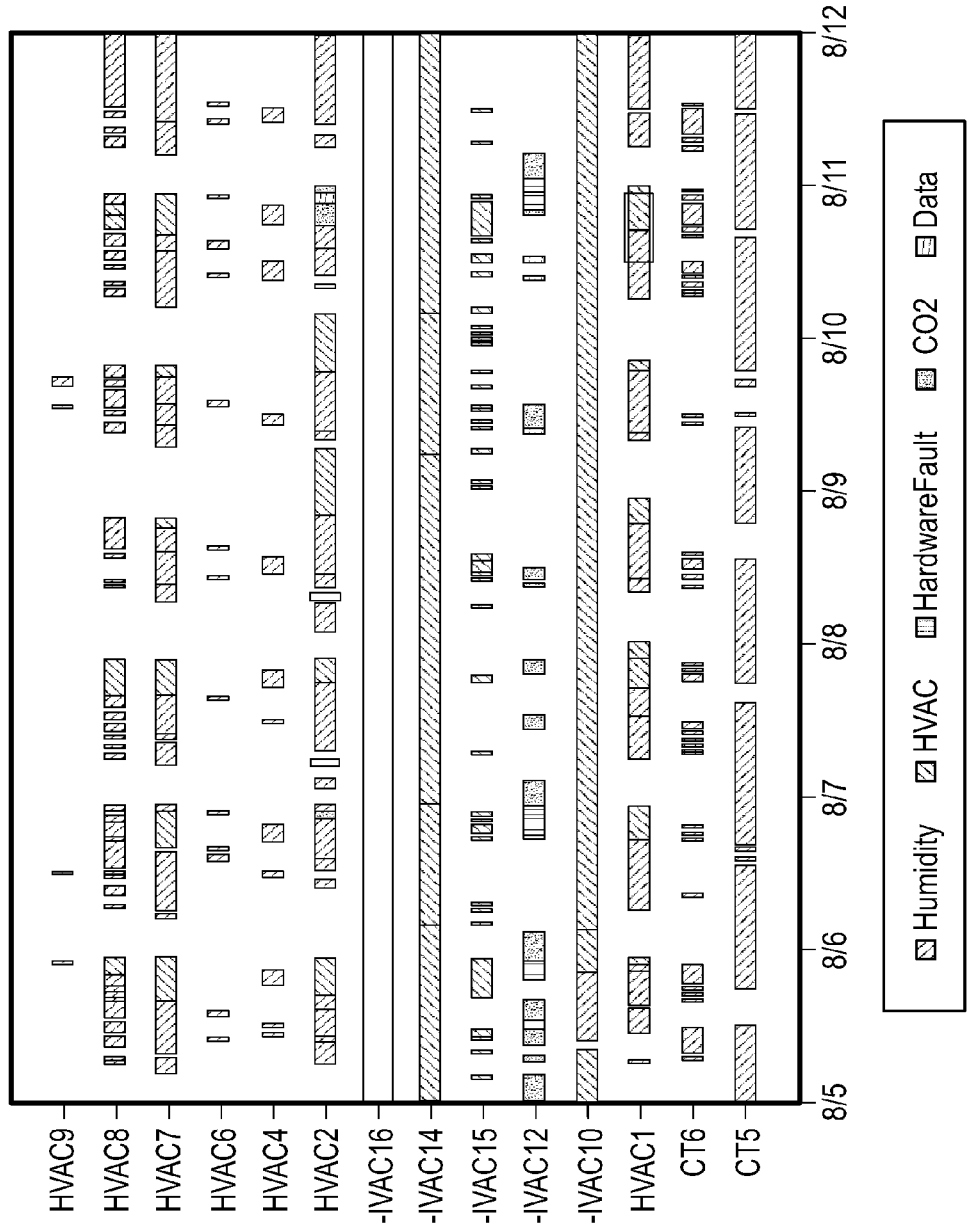
FIG. 2 shows one embodiment of a computer visualization of several controlled devices of the present invention.

In one embodiment, computerized visualization systems may display events over time such that temporal patterns in the events may be detected. FIG. 2 shows one embodiment of a computer visualization of several controlled devices of the present invention. A legend 201 of different colors in the computer visualization is shown at the bottom of FIG. 2. In this embodiment, time is displayed on the x-axis and the sensor is displayed on the y axis. If no event occurs for a particular sensor, nothing may be displayed. If an event occurs, the event may be displayed in color. By overlaying the events, a chart may be displayed that appears similar to a DNA chart. The event patterns may be analyzed to detect similar occurrences between sensors. Service personnel can use this information to detect patterns and to remedy problems.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible data monitoring systems and methods, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A system for detecting a pattern from one or more events comprising:
   data collected from one or more sites over time wherein said data is generated from equipment for monitoring and controlling environmental conditions at said one or more sites;
   one or more rules, where the one or more rules look for certain patterns in the data over time and dynamically assign and update a score to each event that indicates its level of importance; and
   a processor, wherein said processor applies said data against said one or more rules to create one or more events wherein said one or more events represent a detection of a specific condition that starts at a specific time and continues for a specific duration and applies said one or more events and additional data collected from said one or more sites over time to said one or more rules to create one or more additional events wherein once the one or more additional events have been created and the additional data has been analyzed, using a new set of rules to analyze the one or more additional events wherein said one or more additional events include whether said one or more events exceeds the specific duration.

2. The system of claim 1 wherein a priority or ranking may be assigned to said one or more additional events.

3. The system of claim 1 wherein said data includes temperature, light, or humidity.

4. The system of claim 1 wherein said one or more rules are computer programs that analyze a series of said data over time.

5. The system of claim 1 wherein information concerning said one or more additional events are delivered to a user.

6. The system of claim 1 wherein said one or more additional events are compared to one another based on said one or more sites from which said additional data was collected.

7. The system of claim 1 wherein a change in said additional events over time is detected or analyzed by the processor.

8. The system of claim 1 further comprising a computer visualization system for displaying over time said one or more additional events.

9. The system of claim 1 wherein said one or more events includes one or more of a: unique identifier, start time, finish time, event key, sensor key, category, score, and message.

10. A method for detecting a pattern from one or more events comprising:
    collecting data, utilizing a processor, from one or more sites over time wherein said data is generated from equipment for monitoring and controlling environmental conditions at said one or more sites;

applying one or more rules to said data where the one or more rules look for certain patterns in the data over time; and utilizing the results from said application of one or more rules to create one or more events wherein said one or more events represent a detection of a specific condition that starts at a specific time and continues for a specific duration, where the one or more rules dynamically assign and update a score to each event that indicates its level of importance;

applying said one or more events and additional data collected from said one or more sites over time to said one or more rules to create one or more additional events wherein once the one or more additional events have been created and the additional data has been analyzed, using a new set of rules to analyze the one or more additional events wherein said one or more additional events include whether said one or more events exceeds the specific duration.

11. The method of claim 10 wherein a priority or ranking may be assigned to said one or more additional events.

12. The method of claim 10 wherein said data includes temperature, light, or humidity.

13. The method of claim 10 wherein said one or more rules are computer programs that analyze a series of said data over time.

14. The method of claim 10 wherein information concerning said one or more additional events are delivered to a user.

15. The method of claim 10 wherein said one or more additional events are compared to one another based on said one or more sites from which said additional data was collected.

16. The method of claim 10 wherein a change in said additional events over time is detected or analyzed by the processor.

17. The method of claim 10 further comprising a computer visualization system for displaying over time said one or more additional events.

18. The method of claim 10 wherein said one or more events includes one or more of a: unique identifier, start time, finish time, event key, sensor key, category, score, and message.

* * * * *